(12) United States Patent
Valecha et al.

(10) Patent No.: US 11,049,199 B2
(45) Date of Patent: Jun. 29, 2021

(54) CONTEXTUAL TRIP ITINERARY GENERATOR

(71) Applicant: Microsoft Technology Licensing, LLC, Redmond, WA (US)

(72) Inventors: Vaibhav Valecha, Hyderabad (IN); Puspendra Kumar, Kondapur (IN); Gopinath Shankar, Chennai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 15/804,805

(22) Filed: Nov. 6, 2017

(65) Prior Publication Data
US 2019/0139165 A1    May 9, 2019

(51) Int. Cl.
*G06Q 50/14* (2012.01)
*G06Q 30/06* (2012.01)

(52) U.S. Cl.
CPC ......... *G06Q 50/14* (2013.01); *G06Q 30/0635* (2013.01)

(58) Field of Classification Search
CPC ............................ G06Q 50/14; G06Q 30/0635
USPC .................................................... 705/26.62
See application file for complete search history.

(56) References Cited

U.S. PATENT DOCUMENTS

| | | | |
|---|---|---|---|
| 2011/0184806 A1* | 7/2011 | Chen ...................... | G06Q 30/02 705/14.52 |
| 2014/0229102 A1* | 8/2014 | Bapna .................. | G06Q 10/025 701/491 |
| 2015/0242930 A1* | 8/2015 | Greystoke .......... | G06Q 30/0631 705/26.7 |
| 2016/0371798 A1* | 12/2016 | Ghahramani .......... | G06Q 50/14 |
| 2017/0134335 A1* | 5/2017 | Goldstein ............. | H04L 51/046 |
| 2018/0107950 A1* | 4/2018 | Gonzalez ............. | G06Q 10/025 |

OTHER PUBLICATIONS

Yoon, H, Zheng, Y, Xie, X, & Woo, W, Social Itinerary Recommendation from User-Generated Digital Trails, 2012, Personal and Ubiquitous Computing, 16(5), pp. 469-484. (Year: 2012).*

* cited by examiner

*Primary Examiner* — Jason B Dunham
*Assistant Examiner* — Brittany E Bargeon
(74) *Attorney, Agent, or Firm* — Medley, Behrens & Lewis, LLC (57) ABSTRACT

A method may include analyzing, using at least one processor, a corpus of data to identify a plurality of travel-related user inputs from a user; learning, using the at least one processor, a plurality of travel-related preferences for the user based on the plurality of travel-related user inputs; determining, using the at least one processor, a duration and location for a trip based in part on a query received from the user; accessing a plurality of points of interests (POIs) associated with the location, wherein respective point of interests are associated with a plurality of respective characteristics; based on the plurality of characteristics and the plurality of travel-related preferences, identifying a subset of the plurality of POIs to include in a trip itinerary; and presenting the trip itinerary to the user.

20 Claims, 6 Drawing Sheets

CONTEXTUAL TRIP ITINERARY GENERATOR

BACKGROUND

A user may use a web browser to plan for an upcoming trip. For example, the user may navigate to a travel website and enter in a date range and location to find hotels and airfare. The user may also search for places to visit while on the trip. In some instances, a website may have prepackaged itineraries that the user may browse.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

There are a number of problems with existing electronic trip-itinerary methodologies that may be solved using the methods and systems described herein. A trip may include one or more locations (cities, states, countries, etc.) and a duration. For example, one possible trip-itinerary method is a user manually researching across disparate websites to find attractions in the location(s) that fit the user's preferences. Then, the user may need to plan a route through all the attractions. Even then, the user may not know all the details of a given place (e.g., price, days it is closed, etc.) Accordingly, this may be a time-consuming process for the user. Alternatively, the user may rely on prepackaged itineraries for a given destination, but these itineraries will not be sufficiently specific to meet all the user's preferences. The lack of user preference matching may be true even if a website offers some basic options such as trip duration and interest types. This may lead to the user customizing the itinerary further or regenerating the plan entirely.

In various examples described herein, a system is used to track a user's (with the user's consent) electronic activity over a period of time. The activity may be mined to determine the user's travel preferences. Then, after the system has been trained, the system may respond in real-time to a trip itinerary related query with a personalized trip itinerary. The use of this system may alleviate the problems of the time-consuming manual searching, as well problems with computer-directed itinerary generation. As may be seen during the detailed discussion below, solving the problems of existing computer-directed solutions is inherently a computer-focused task implicating a number of technical areas including search engines, artificial intelligence, and graphical user interfaces.

Figure 1:
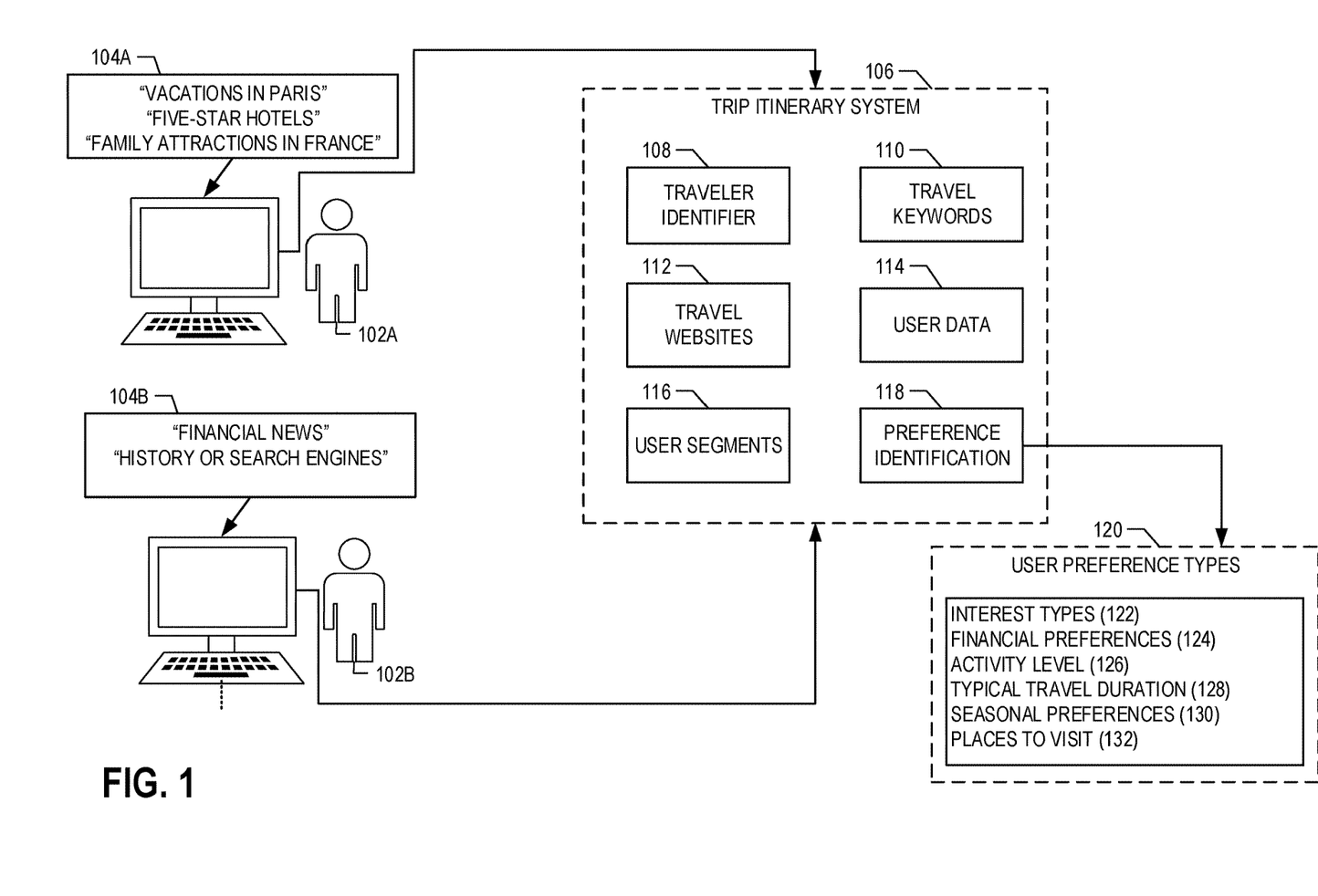
FIG. 1 illustrates a schematic diagram of a trip itinerary system, according to various examples.

FIG. 1 illustrates a schematic diagram of a trip itinerary system, according to various examples. Generally, FIG. 1 illustrates the components used for offline processing (e.g., performed over a period of time and not required to answer a user query) to analyze user input signals (e.g., input signals 104A and input signals 104B) to determine one or more segments (e.g., categories of like users) for user 102A and user 102B. A flowchart describing this processing is presented in FIG. 2. Furthermore, the components used for real-time responses to a user query are illustrated in FIG. 3—with a corresponding flowchart in FIG. 4, according to various examples.

Returning to FIG. 1, trip itinerary system 106 is illustrated as including traveler identifier 108, travel keywords 110, travel websites 112, user data 114, user segments 116, and preference identification 118. Also illustrated are user preference types 120 that may be determined by preference identification 118. The types may include, but are not limited to, interest types 122, financial preferences 124, activity level 126, travel duration 128, seasonal preferences 130, and places to visit 132.

Trip itinerary system 106 is illustrated as set of separate processing components (e.g., traveler identifier 108) and storage components (user data 114). However, the functionality of individual processing components may be performed by a single component. A processing component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure. Similarly, data represented by a multiple storage components may be stored in a single storage component.

Although not illustrated, data stored in trip itinerary system 106 may be stored in a variety of formats and across one or more devices. For example, relational databases, flat file databases, NoSQL databases, graph databases, etc., may be used without departing from the scope of this disclosure.

In various examples, the components of FIG. 1 (as well as FIG. 3) may communicate via one or more networks. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

In some examples, trip itinerary system 106 processes a variety of input data (also referred to as input signals) from a variety of sources to determine user preferences as they relate to traveling. The sources may include, but are not limited to, search queries, web sites visited, social media posts, e-mails, audible or typed requests to digital assistants (e.g., chat bots), etc. The input sources may be accessed via a network using an application programming interface in some examples. In some examples, trip itinerary system 106 hosts one or more of the sources types using a web server. For illustration purposes, many of the examples described herein use search queries and web site visits as the input signals.

In order to protect its users' privacy, trip itinerary system 106 may transmit opt-in requests to its users requesting access to the sources. Periodically, trip itinerary system 106 may send reminders to its users indicating the level of access trip itinerary system 106 has to information transmitted to each source. Furthermore, to the extent possible, personally identifiable information may be removed from the input data (e.g., phone numbers, addresses, etc.).

In some examples, trip itinerary system 106 provides services beyond that of contextual trip itinerary generation. For example, trip itinerary system 106 may provide some of the services that generate user signals such as search engine, e-mail, digital assistants, etc. These services may be provided by the same or additional computing resources as those for trip itinerary system 106. In some examples, a user is assigned a global user identification (e.g., e-mail address) for use across the various services.

As illustrated, input signals 104A, 104B may be search queries that have been entered into a search engine. The search engine may be provided by a web server (not illustrated) of trip itinerary system 106. The search engines may be related to travel (e.g., input signals 104A) or may not be related to travel (e.g., input signals 104B). Trip itinerary system 106 may collect input signals and store them in a data store such as user data 114. The input signals may also be time-stamped and collected over a predetermined period (e.g., a year) for later analysis. Accordingly, as discussed further below, different time periods (e.g., summer) indicated in a travel query, may be correlated with different user preferences (for the same user).

The input signals may be associated with the user's identification and the time the query was made. In an example, an input signal stored in user data 114 is associated with the user identification when a row entry in a database for an input signals identifies, directly or indirectly, the user identification. Thus, a query may be made to user data 114 to retrieve all input signals for a user by using an input criteria that includes the user identification. The results may be furthered narrowed by adding a time period to the input criteria.

Processing input data to identify traveler preferences for all users may be a wasteful use of computing resources. To conserve computing resources, traveler identifier 108 may identify a subset of users that have shown a propensity to be interested in travel based on using travel keywords 110 or visiting travel websites 112. The process of travel identification is discussed further with reference to FIG. 2.

User data 114 may store information on users that interact with trip itinerary system 106. The information may be stored as a user account. As discussed above, some of the user data may input signals collected for the user. User data 114 may also store the user preferences determined using preference identification 118. Furthermore, user data 114 may store preferences for how long input signals may be collected for the user and which services the user authorizes trip itinerary system 106 to collect input data from. User data 114 may store user credentials may be also be stored for services that are not offered as part of trip itinerary system 106.

User segments 116 may represent different subsets of the population of users (e.g., "adventure seekers on a budget" or "museum lovers in Europe". For example, a user may be classified into a segment based on or more of the types in user preference types 120. Accordingly, the numbers of possible segments may be dictated by the number of permutations possible of the types and the range of values for each type. In some instances there may be a different segment for each user whereas some segments may have a cluster of similar users. A segment may have an identifier that is stored as associated with a user account in user data 114 (e.g., Bob Smith's account is classified as segment 143).

Figure 2:
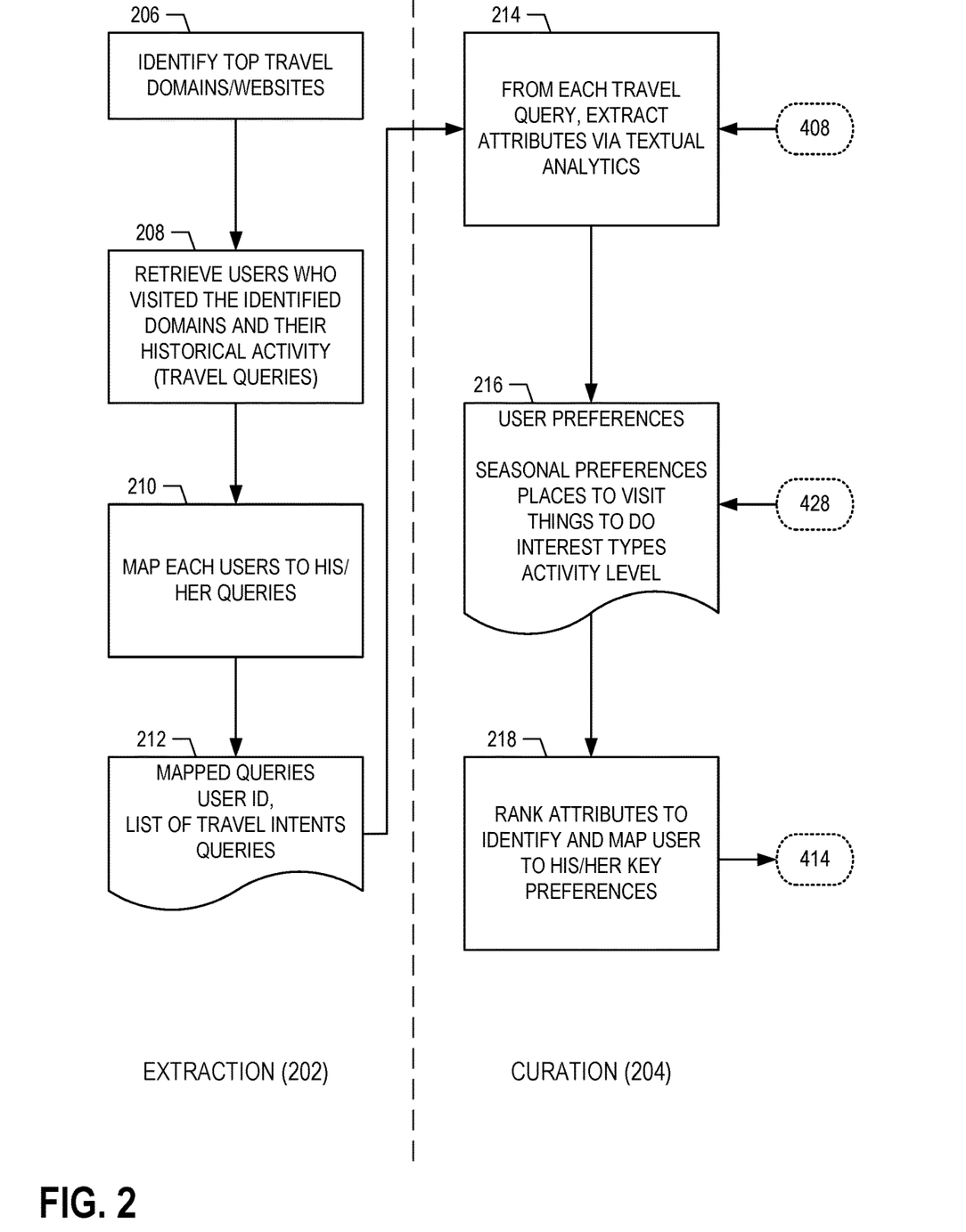
FIG. 2 illustrates a method flowchart for offline analysis of user data, according to various examples.
Figure 3:
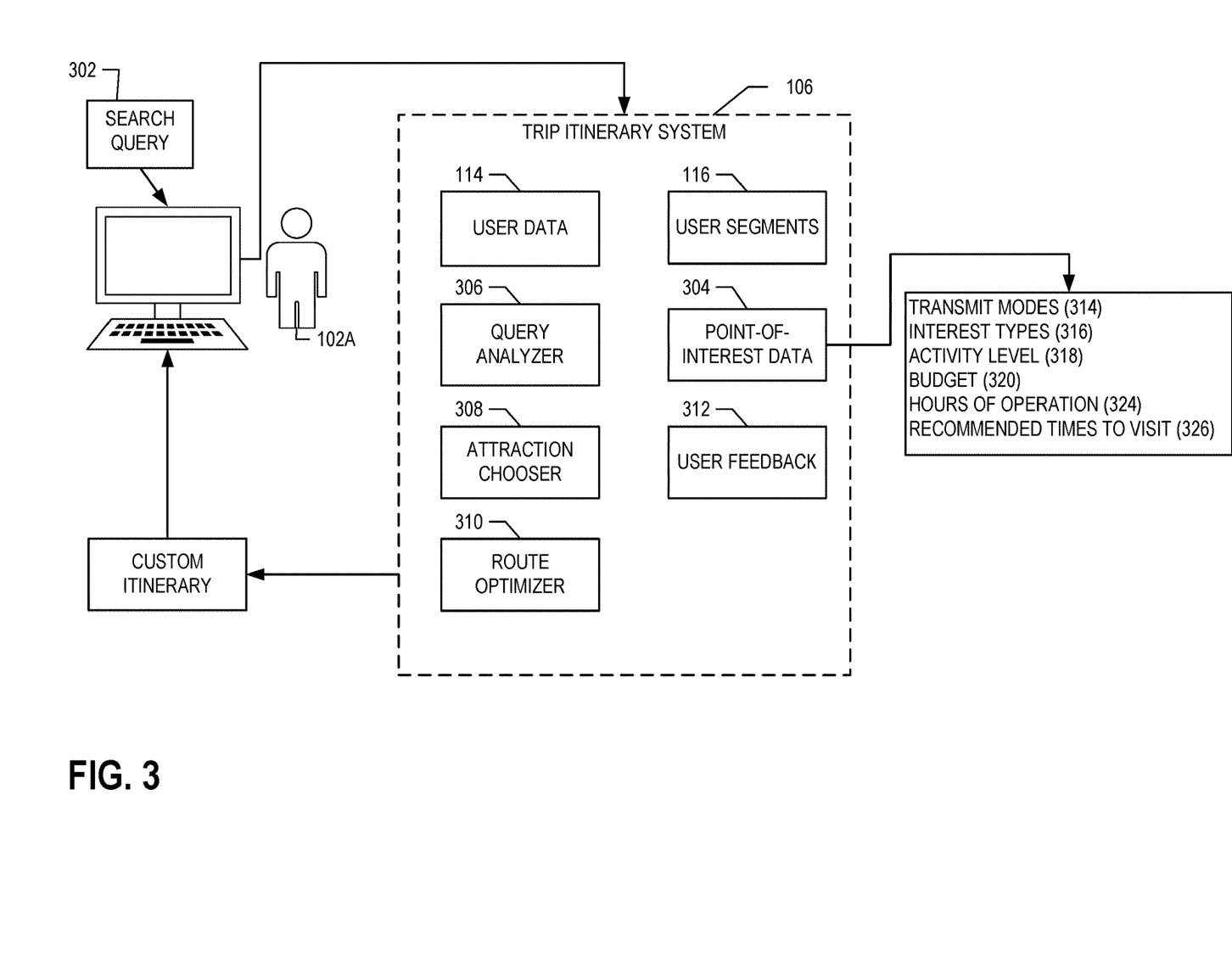
FIG. 3 illustrates a schematic diagram of a trip itinerary system, according to various examples.

User preference types 120 list a number of types of user preferences for a user that may be determined based on the input signals (as detailed with respect to FIG. 2). The names of the preference types are for illustration purposes and other name may be used without departing from the scope of this disclosure. Similarly, more or fewer types may be used with trip itinerary system 106.

Interest types 122 (e.g., one of the preference types) may be identify the strength of interests of a user in a variety of possible activities. Interest types may include, but are not limited to, family & kids, historical, museum, beaches, arts & culture, food & drinks, island, outdoor, entertainment, leisure, adventure, aquarium, shopping, zoo. In some examples, user data 114 includes a strength indicator for each type of indicator. The strength indicator may be an absolute indicator (e.g., one through five) or a standardized (e.g., zero to one) based on the maximum interested type. For example, a user may have five times as many queries for "zoo" as "island." Accordingly, "zoo" may be set to 1 and island 0.2. Other ranking and rating methodologies may be used without departing from the scope of this disclosure. In some instances, specific attractions (e.g., San Diego Zoo) the user has searched for may be saved as an interest type.

Financial preferences 124 may identity the quantitative or qualitative preferences for a user as they relate to an interest type or aspects of travel (e.g., hotels, flights, etc.). One of the financial preferences may be an overall financial preference for travel (e.g., "spring break trips under $2000"). The quantitative/qualitative ranges may be based on the input signals (e.g., "hotels under $200 dollars in Spain") or predefined buckets (e.g., hotels from 100-200 a night, 201-300 a night, etc.).

Activity level 126 may identify a user's preference for how much they like physical activities. For example, the user may indicate they have a preference for a low level of activity by searching for "beaches" or "spas." A high level of activity preference may be identified by "hiking." A rules database may correlate different interest types with a level of activity. Thus, activity level 126 to be inferred based on whether or not the user has expressed an interest in a particular interest type.

Travel duration 128 may identify a preferred travel length for a trip. Different travel durations may be stored for different types of travel and locations. For example, a user may have input signals that indicate a preference for a seven-day spring break trip and a four-day weekend getaway close to the user's residence.

Seasonal preferences 130 may identify both the changes in user preferences based on season, as well as preferred times to travel. For the former, a user may search for trips to Florida during the winter and trips to Alaska when it is the summer. For the latter, input signals may indicate that the user searches for trips in the summer more than trips in the winter, regardless of the time actual time of year. Accordingly, a presented contextual trip itinerary may assume that the user wants an itinerary for the summer—even if the search is conducted in the winter. Places to visit 132 may identify one or more places that the user indicated an interest to travel to (e.g., "vacation in Paris").

In various examples, data representing user preference types 120 may be stored as a series of table entries that include multiple preference types. For example, an entry may indicate "location: Paris; duration: three days." The precise format of the entry may take many forms; however, a standardized format may be used such that a user account may be queried using multiple types. Thus, user data 114 may be queried for the user preference using "Paris," and a segment or user identification; then, the duration of "three days" may be returned. In contrast, a search using "Tampa" may return a duration of "seven days."

FIG. 2 illustrates a method flowchart 200 for offline analysis of user data, according to various examples. Flowchart 200 is separated into two portions for discussion purposes: the extraction portion 202 and curation portion 204. The operations described in FIG. 2 may be performed by one or more processing units of trip itinerary system 106 discussed in FIG. 1.

At element 206, the top (e.g., top 100) travel websites may be identified. Identification may be completed manually or part of an automatic filtering. For example, metadata of a website may be automatically parsed and include a keyword of "travel" or "vacation" and the like. Additionally, trip itinerary system 106 may access an index of websites and the websites may be clustered according to the volume of travel related keywords present on a website. In some instances, the identification may include querying travel websites 112.

At element 208, users that have visited one or more of the top travel websites may be compiled into a list of travelers or other data structure. Data on user visits may come from the user's browser history or by tracking what sites a user visits after conducting a search query. The search query may be processed by a search engine of trip itinerary system 106. The use of the data may be previously authorized by the user. Additional criteria may be used to limit the number of users in the list. For example, there may be a minimum number of visits to a top travel domain before the user is included in the list. The frequency of visits may also be used as a factor. For example, if a user visits four travel sites in a week they may be included in the list, whereas a user visiting four travel sites over a six-month period may not. Rules for including/excluding users may be stored in trip itinerary system 106. In an example, the process of compiling the list is completed by traveler identifier 108.

At element 210, received queries may be mapped to a user (mapped queries 212). A mapping may include associating a user identifier with a query in user data 114. As discussed previously, other input signals may be used, but search queries are used as an ongoing example. The queries may have already been received by trip itinerary system 106 and stored in user data 114 over a period of time (e.g., a year). In other words, once the list of travelers has been generated, trip itinerary system 106 may look backward to queries conducted users in the list.

Because trip itinerary system 106 is generally concerned with travel, queries that are not travel related may be ignored and not mapped. Artificial intelligence models may be used to help filter the non-travel queries from the travel-related queries. Natural Language Processing (NLP) and classification algorithms (e.g., Multinomial Naïve Bayes, Support Vector Machines, Decision Trees, etc.) with travel keywords 110 may be used to determine a likelihood that a query is travel related. If the likelihood is above a certain threshold (e.g., 70%) the query may be considered travel related. Other classification algorithms may be used without departing from the scope of this disclosure (e.g., neural networks).

Once the list of travel related queries is determined, relevant insights/attributes may be extracted from the queries at element 214. The same or different NLP algorithms may be used to determine one or more user preferences 216 (e.g., those in user preference types 120). The user preferences may be determined at the same time the query is determined to be travel related, in an example. The user preferences 216 may be stored with an indication of when (e.g., date) the query was made to account for seasonal differences.

For example, a Latent Dirichlet Allocation (LDA) may be used to determine the topic(s) of a query (e.g., hotels, airfare, attraction) and syntactic parsing may then be used to determine the parts of speech of the query. Named entity recognition (NER) may be also used to infer information about the user's preferences. Accordingly, for a query of "4-star hotels in Paris" NER may pull out: hotels, Paris, 4-star. Based on this information—even without LDA or syntactic parsing—a financial user preference and a places to visit preference may be determined.

At element 218, the various attributes for each user preference may be ranked according to a determined rating (qualitative or quantitative) based on parsing the queries at element 214. For example, each user preference may be have a set of pairs such as [attribute: rating]. In a more specific example, the interest types user preference may be:

[zoos: 3]
[adventure: 8]
[outdoor: 7]

The ranking for an attribute may be determined in a number of ways including how recent a query was made using the attribute, the frequency of use of an attribute, and the number of times the attribute was searched for compared to other attributes (e.g., a percentage of all attributes).

In some examples, trip itinerary system 106 may serve a user interface (e.g., a web-based application) to a user device to enable the user to see and modify the rankings of each attribute. Similarly, the user interface may display the determined preferences for the user and allow removal or additions to the preferences. For example, the interface may display the locations the user has searched for and the user may, via a user input element, indicate that one or more of the locations are not associated with travel. This may occur when the user searches for a location, but not in a travel context ("e.g., historical sites in Greece"), but trip itinerary system 106 determined the likelihood of the query being for travel was above the determined threshold, as discussed previously.

FIG. 3 illustrates a schematic diagram of trip itinerary system 106, according to various examples. Some of the components illustrated in trip itinerary system 106 from FIG. 1 have been removed for visual simplicity. With respect to FIG. 3, it is assumed that trip itinerary system 106 has collected sufficient (e.g., collected over a threshold amount of time) data and performed preference identification 118 to determine at least some user preferences for user 102A.

As illustrated in FIG. 3, trip itinerary system 106 includes user data 114, user segments 116, point-of-interest (POI) data 304, query analyzer 306, attraction chooser 308, route optimizer 310, and user feedback 312. POI data 304 may include data on transit modes 314, interest types 316, activity level 318, budget 320, hours of operation 322, popularity 324, and recommended times to visit 326. In an example, search query 302 is received from user 102A at trip itinerary system 106, processed by the system, and custom itinerary 328 is presented to user 102A. Attraction chooser 308, route optimizer 310, user feedback 312, and transit modes 314 are discussed in further detail with respect to FIG. 4.

In various examples, POI data 304 is stored as a knowledge graph (e.g., a graph database) for places, attractions, events, and the like, that a user may wish to visit or experience on a vacation Although not illustrated in FIG. 3, POI data 304 may also include location information that may be used by route optimizer 310 to determine a route for a user as discussed further below. Location information may include address information (e.g., street, city, state, country, etc.) or coordinate information (e.g., GPS), such as may be used for attractions in portions national parks or other non-vehicle accessible attractions. Transit modes 314 may include the ways (e.g., air, land, boat, walking) an attraction may be visited. Transit modes 314 may also include times each of the modes of travel may be used. Hours of operation 322 may include the different times an attraction is open—taking into consideration that the hours may be different for different times of the year.

Some of the values data in POI data 304 may be the selected from the same data ranges/categories as the values used in preference types 120. For example, categories for interest types 316 may include the same categories as interest types 122. Similarly, activity level 318 and budget 320 may have similar ranges as activity level 126 and financial preferences 124. Different value ranges/types may be used in some instances. For example, financial preferences 124 may identify a range of $1000-2000 and budget 320 may specific an absolute number such as $450.

Popularity 324 may include an indication of how popular the attraction is relative to other attractions. The population may be based on the number of times an attraction has been included in an itinerary. In some examples, third party data issued to determine the popularity of an attraction.

Figure 4:
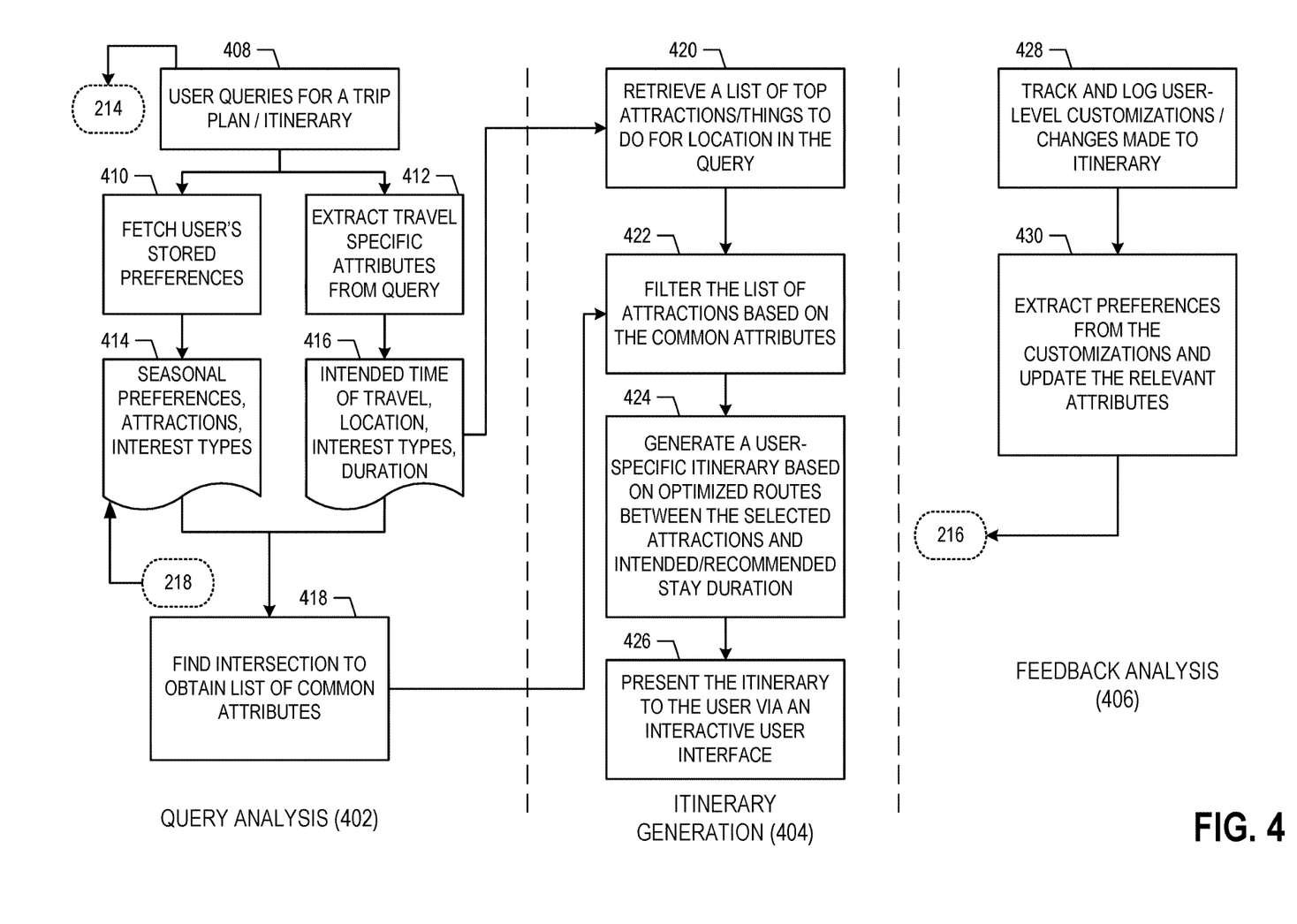
FIG. 4 illustrates a method flowchart for presenting a contextual trip itinerary, according to various examples.

FIG. 4 illustrates a method flowchart 400 for presenting a contextual trip itinerary, according to various examples. Flowchart 400 is separated into three portions for discussion purposes: the query analysis portion 402, the itinerary generation portion 404, and the feedback portion 406. The operations described in FIG. 4 may be performed by one or more processing units of trip itinerary system 106 discussed in FIG. 1.

At element 408, a user submits a query for a trip plan or itinerary (e.g., search query 302). Initially, trip itinerary system 106 may not know whether to search query 302 is a query for a trip plan. However, query analyzer 306 may determine a likelihood that search query 302 is travel related in the same manner as described previously. Indeed, query analyzer 306 may be used both in the offline analysis described in FIG. 2 as well as in determining the contextual trip itinerary. If, at element 408, it is determined that the likelihood is above a certain threshold then at element 410 user's stored preferences 414 may be retrieved and at element 412 travel specific attributes 416 may be extracted from search query 302.

Determining a user's stored preferences may include retrieving a user identification for user 102A. The user identification may come from login information provided by the user. For example, a user may have persisted session data while searching. The session data may include the user identification. The user identification may be used to retrieve the user's preferences from user data 114. In some examples, user data 114 may include a segment identifier to a set of preferences stored in user segments 116. At element 414, the seasonal preferences, attractions, interest types, etc., may be retrieved from user data 114 or user segments 116.

Query analyzer 306 may determine travel specific attributes (e.g., element 416) from search query 302. Travel specific attributes may include location destination, interest types, duration of travel, etc. Query analyzer 306 may use similar techniques as discussed above. In other words, algorithms such as Latent Dirichlet Allocation and Named entity recognition (NER) may be used. In some instances, a specific location destination (e.g., city) or duration is not listed in the query. In such instances, the user's preferences may be used to infer the location or duration.

At element 418, the intersection of attributes in user's stored preferences 414 and travel specific attributes may be determined. For example, if the search query was for Paris in June, the user's preferences for Paris in June may be used.

At element 420, a list of top attractions/things to do for the determined location destination in search query 302 may be retrieved. The attractions may be retrieved by querying POI data 304 for the top (e.g., 100) attractions based on popularity in the determined location destination. In some examples, the top X attractions for each interest type may be retrieved for the location destination.

At element 422, the list is filtered based on the common attributes determined at element 418. Thus, if the stored user's preferences indicated that user 102A was interested in museums and castles, POIs that were not museums or castles would be excluded. In some examples, the top (e.g., three) interest types in the user's stored preferences are used if more than a threshold number of interest types remain at element 418. In other examples, a single interest type is used and all the attractions that are of that type are initially maintained. The list may further be filtered based on the duration of the trip (e.g., only so many attractions may be seen in a given time period). Other POI may also be used to filter the list (e.g., the days the attraction is open compared to suggested Monday through Friday trip). In an example, the operations of elements 418, 420, and 422, are performed by attraction chooser 308.

At element 424, a user-specific itinerary is generated. The itinerary may be based on an optimized route (e.g., using route optimizer 310) between the selected (e.g., filtered) attractions and intended recommended stay duration. In some instances, there may be more attractions than may be traveled to given the duration of a user's tripe. Accordingly, weights may be assigned to the various attributes of the user's preferences and types of POI data to reduce the number of attractions. For example, weights may be assigned to cost, travel time (e.g., between two attractions based on a POIs address/GPS information and transmit modes), popularity, etc. The weights may be stored in trip itinerary system 106 and, in some examples, may be modified by an end-user or administrator of trip itinerary system 106. In an example, the total time the user has to travel is minimized—thus maximizing the number of attractions for a given period. The travel time may also take into consideration POI specific recommended transit modes, should they exist. Any suitable route optimization algorithm (e.g., Dijkstra's algorithm) may be used without departing from the scope of this disclosure.

A Monte Carlo simulation (e.g., 10,000 randomized trials) may be run using a different number of attractions and different selected attractions to determine the total highest score given the assigned weights. Thus, the attractions that are in the highest randomized trial that meet the duration limits may be selected for inclusion in the user-specific itinerary.

The user-specific itinerary may be stored in a variety of manners. For example, the itinerary may be stored as an ordered set of attractions based on the output of route optimizer 310. Each attraction may include some or all of its POI data. The attraction may also include a recommended time to arrive and to leave in order to stay on schedule. As attractions may also include restaurants, the itinerary may include recommended food attractions as well. An attraction may also include directions to it from a previous attraction (and/or directions to the next attraction) and the recommended mode of transit. The itinerary may be stored in a standardized format such that different output modes may be used (e.g., e-mail, mobile phone presentation, desktop browser, etc.).

At element 426, the user-specific itinerary (e.g., custom itinerary 328) is presented to user 102A in a graphical user interface (GUI). The presented user-specific itinerary may be presented inline with search results for search query 302 in an example. In another example, the user-specific itinerary is presented in a separate portion of a webpage from the results. The itinerary may include a map portion and a POI portion including the attractions determined for the user. In some examples, each attraction has a shortened label that is presented on the map portion (e.g., A for the first attraction, B for the second attraction). Thus, the user may be able to visualize their trip. In some examples, the list of attractions is presented without a map and a vice-a-versa.

In some examples, the GUI includes controls (e.g., drag-and-drop, numbered lists, etc.) to edit the list of determined attractions in their itinerary. The user may remove or reorder the attractions. In some examples, the user may add an attraction using a drop-down menu or search field. At element 428, the changes made to the user-specific itinerary are tracked and logged. Based on these changes, at element 430, user preferences may be extracted. For example, if the user adds an attraction for a non-presented interest type, the value for the added interest type may be increased.

Figure 5:
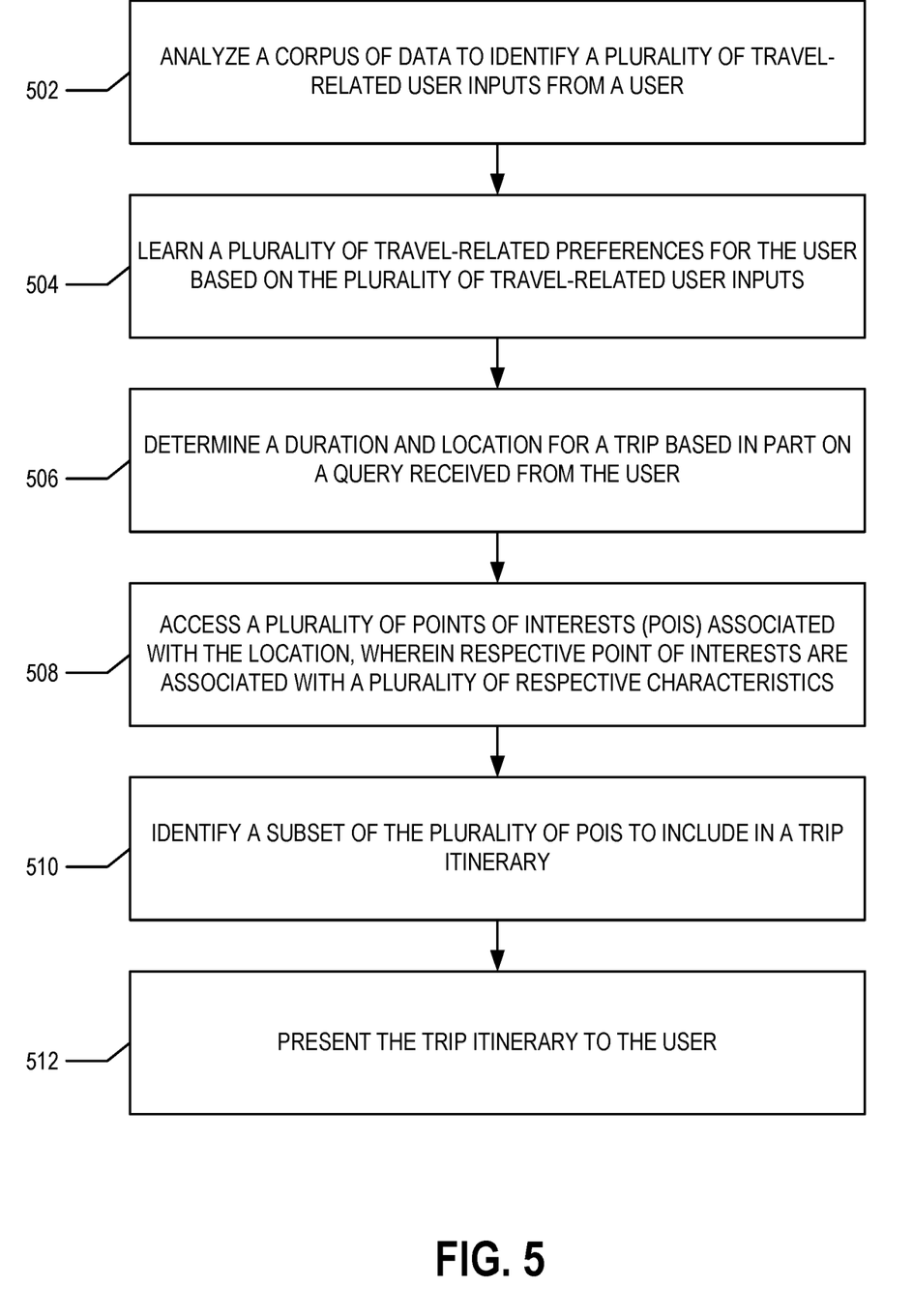
FIG. 5 illustrates a method flowchart to present a trip itinerary, according to various examples.

FIG. 5 is a flowchart illustrating a method to present a trip itinerary, according to various examples. The method may be embodied in a set of instructions stored in at least one non-transitory storage device of a computing device(s). The computing device(s) may have one or more processors that execute the set of instructions to configure the one or more processors to perform the operations illustrated in FIG. 5. To this end, the one or more processors may instruct other parts of the computing device to carry out the set of instructions. For example, the computing device may instruct a network device to transmit data to another computing device or the computing device may provide data over a display interface to present a user interface. In some example, performance of the method may be split across multiple computing devices in different geographic regions.

At operation 502, in an example, a corpus of data is analyzed to identify a plurality of travel-related user inputs from a user. The corpus of data may have been collected over a period of time (e.g., over a year) from a variety of sources (e.g., search engines, e-mails, social media accounts, etc.) For example, the corpus of data may be user data 114. Identifying whether or not an input is travel related may include performing NLP on the input to determine the likelihood the input is travel related. In some examples, a user's inputs are only analyzed if there is a frequency of travel-related keywords received over the period of time.

At operation 504, in an example, a plurality of travel-related preferences may be learned for the user based on the plurality of travel-related user inputs. Learning may include a query analysis (e.g., using query analyzer 306) for the travel-related inputs. The travel-related preferences may include those depicted in user preference types 120, in various examples.

At operation 506, in an example, a duration and location destination (e.g., city, state, country) for a trip may be determined based in part on a query received from the user. The query may be received from a computing device (e.g., mobile phone, tablet, etc.). The query may have been entered in a search engine. The duration and location destination may be determined using NLP if possible. If NLP fails to explicitly list a location destination or duration, the location destination or duration may be determined using the travel-related preferences. Query analyzer may determine the query to be travel related before operation 508 is performed. If the query is not travel-related, the method of FIG. 5 may stop.

At operation 508, in an example, a plurality of points of interests (POIs) associated with the location destination are accessed (e.g., those POIs which include an address in the location destination), wherein respective point of interests are associated with a plurality of respective characteristics. The characteristics may be those depicted in POI data 304, according to various examples. In some examples, the characteristics have assigned weights. The weights may be assigned based on the travel-related preferences. For example, the travel-related preferences may indicate that a user uses budget keywords (e.g., "low cost") more frequently than uses a particular interest type. (e.g., "museums"). Thus, budget characteristics may be more heavily weighted than interest types within the travel-related preferences.

At operation 510, in an example, based on the plurality of characteristics and the plurality of travel-related preferences, a subset of the plurality of POIs to include in a trip itinerary may be identified. The identification may include filtering out POIs that do not match the interest types previously learned. Further details of POI selection are discussed previously with respect to attraction chooser 308. In addition to identifying the POIs, the trip itinerary may include a recommended travel route between the subset of POIs. The recommend travel route may be determined using route optimizer 310 as discussed above. For example, the recommend travel route may be based in part on an algorithmic application of the assigned weights of the characteristics.

At operation 512, the trip itinerary may be presented to the user. Presenting may include transmitting the trip itinerary to the user device that sent the query received at operation 506. The trip itinerary may include a day-by-day breakdown of which POI to visit, when to visit, how to get to the POI, etc. A map with the POIs labeled may also be presented as part of the trip itinerary.

In some examples, an option to change the trip itinerary is presented. The option may be a user input element (e.g., checkbox, dropdown, etc.) to add, replace, or delete presented POIs. An indication (e.g., an HTTP POST command, an event controller notification, etc.) that the user has selected the option to change the trip itinerary may be received. Based on the indication, a travel-related preference may be updated for the user.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
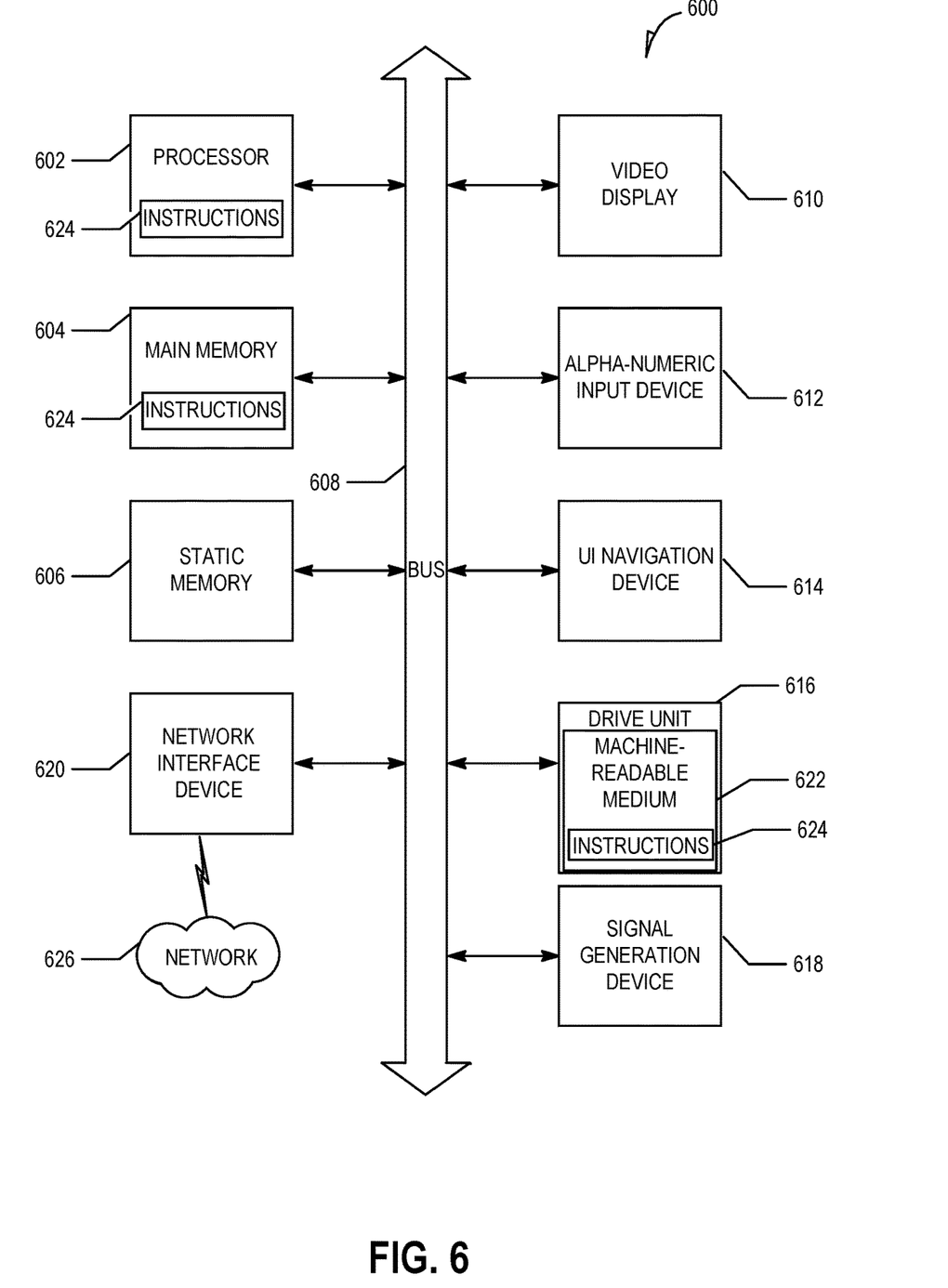
FIG. 6 is a block diagram illustrating an example machine upon which any one or more of the techniques (e.g., methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer implemented method comprising:
   retrieving, from a log of a search engine, queries submitted by users to the search engine;
   based upon user identifiers assigned to the queries in the log of the search engine, mapping, from the queries previously submitted by the users to the search engine, a set of the queries to a user identifier for a user from amongst the user identifiers;
   identifying travel-related queries in the set of queries;
   extracting, by a query analyzer, travel-related preferences for the user based on the identified travel-related queries and storing the travel-related preferences for the user in computer-readable storage, wherein the query analyzer uses computer-implemented natural language processing (NLP) algorithms to extract the travel-related preferences;
   subsequent to extracting the travel-related preferences for the user, receiving, at the search engine and from a client computing device operated by the user, a second query from the user;
   based upon the user identifier for the user, retrieving the travel-related preferences for the user from the computer-readable storage;
   extracting travel related attributes from the second query;
   identifying an intersection between the travel related attributes extracted from the second query and the travel related preferences for the user to yield a list of common attributes;
   determining a duration and location for a trip based in part on the second query;
   retrieving points of interests (POIs) associated with the location;
   filtering the POIs based on the common attributes to yield a subset of the POIs to include in a trip itinerary; and
   presenting the trip itinerary to the user, wherein the trip itinerary includes the subset of the POIs and a suggested order that the POIs are to be visited during a trip that conforms to the trip itinerary.

2. The method of claim 1, wherein filtering the POIs is further based on a duration of the trip that conforms to the trip itinerary.

3. The method of claim 1, wherein identifying the travel-related queries comprises computing a frequency of travel-related keywords in the set of queries.

4. The method of claim 1, wherein the trip itinerary includes a recommended travel route between the subset of POIs.

5. The method of claim 4, wherein a characteristic of the subset of POIs has an assigned weight and the recommended travel route is based in part on an algorithmic application of the weight.

6. The method of claim 1, wherein the travel-related queries are identified through use of the NLP algorithms.

7. The method of claim 1, wherein the method further comprises:
   receiving an indication that the user has selected an option to change the trip itinerary; and
   in response to the indication, updating a user preference.

8. The method of claim 1, wherein the operations of:
   retrieving the queries,
   mapping the set of the queries,
   identifying the travel-related queries, and
   extracting the travel-related preferences,
   are performed in an offline method that is not required to answer any of the queries.

9. The method of claim 8, wherein the operations of:
   receiving the second query,
   extracting the travel related attributes,
   identifying the intersection,
   determining the duration,
   retrieving the POIs, and
   filtering the POIs,
   are performed in a non-offline method.

10. A non-transitory computer readable medium comprising instructions, which when executed by at least one processor, configure the at least one processor to perform operations comprising:
    retrieving, from a log of a search engine, queries submitted by users to the search engine;
    based upon user identifiers assigned to the queries in the log of the search engine, mapping, from the queries previously submitted by the users to the search engine, a set of the queries to a user identifier for a user from amongst the user identifiers;
    identifying travel-related queries in the set of queries;
    identifying, by a query analyzer, travel-related preferences for the user based on the identified travel-related queries and storing the travel-related preferences for the user in computer-readable storage, wherein the query analyzer uses Named Entity Recognition (NER) algorithms to extract the travel-related preferences;
    subsequent to identifying the travel-related preferences for the user, receiving, at the search engine and from a client computing device operated by the user, a second query from the user;
    based upon the user identifier for the user, retrieving the travel-related preferences for the user from the computer-readable storage;
    extracting travel related attributes from the second query;
    identifying an intersection between the travel related attributes extracted from the second query and the travel related preferences for the user to yield a list of common attributes;
    determining a duration and location for a trip based in part on the second query;
    retrieving points of interests (POIs) associated with the location;
    filtering the POIs based on the common attributes to yield a subset of the POIs to include in a trip itinerary; and
    presenting the trip itinerary to the user, wherein the trip itinerary includes the subset of the POIs and a suggested order that the POIs are to be visited during a trip that conforms to the trip itinerary.

11. The non-transitory computer readable medium of claim 10, wherein filtering the POIs is further based on a duration of the trip that conforms to the trip itinerary.

12. The non-transitory computer readable medium of claim 10, wherein identifying the travel-related queries comprises computing a frequency of travel-related keywords in the set of queries.

13. The non-transitory computer readable medium of claim 10, wherein the trip itinerary includes a recommended travel route between the subset of POIs.

14. The non-transitory computer readable medium of claim 13, wherein a characteristic of the subset of POIs has an assigned weight and the recommended travel route is based in part on an algorithmic application of the weight.

15. The non-transitory computer readable medium of claim 10, wherein the travel-related queries are identified through use of the NER algorithms.

16. The non-transitory computer readable medium of claim 10, wherein the operations further comprise:
    receiving an indication that the user has selected an option to change the trip itinerary; and
    in response to the indication, updating a user preference.

17. The non-transitory computer readable medium of claim 10, wherein the operations of:
    retrieving the queries,
    mapping the set of the queries,
    identifying the travel-related queries, and
    extracting the travel-related preferences,
    are performed in an offline method that is not required to answer any of the queries.

18. The non-transitory computer readable medium of claim 17, wherein the operations of:
    receiving the second query,
    extracting the travel related attributes,
    identifying the intersection,
    determining the duration,
    retrieving the POIs, and
    filtering the POIs,
    are performed in a non-offline method.

19. A system comprising:
    at least one processor;
    a storage device comprising instructions, which when executed by at least one processor, configure the at least one processor to perform operations comprising:
        retrieving, from a log of a search engine, queries submitted by users to the search engine;
        based upon user identifiers assigned to the queries in the log of the search engine, mapping, from the queries previously submitted by the users to the search engine, a set of the queries to a user identifier for a user from amongst the user identifiers;
        identifying travel-related queries in the set of queries;
        extracting, by a query analyzer and from the identified travel-related queries, travel-related preferences for the user and storing the travel-related preferences for the user in computer-readable storage, wherein the query analyzer uses at least one natural language processing (NLP) algorithm to extract the travel-related preferences from the identified travel-related queries;
        subsequent to extracting the travel-related preferences for the user, receiving, at the search engine and from a client computing device operated by the user, a second query from the user;
        based upon the user identifier for the user, retrieving the travel-related preferences for the user from the computer-readable storage;
        extracting travel related attributes from the second query;
        identifying an intersection between the travel related attributes extracted from the second query and the travel related preferences for the user to yield a list of common attributes;
        determining a duration and location for a trip based in part on the second query;
        retrieving points of interests (POIs) associated with the location;
        filtering the POIs based on the common attributes to yield a subset of the POIs to include in a trip itinerary; and
        presenting the trip itinerary to the user, wherein the trip itinerary includes the subset of the POIs and a suggested order that the POIs are to be visited during a trip that conforms to the trip itinerary.

20. The system of claim 19, wherein filtering the POIs is further based on a duration of the trip that conforms to the trip itinerary.

* * * * *